United States Patent [19]

Umezu

[11] Patent Number: 4,517,812
[45] Date of Patent: May 21, 1985

[54] LOAD CONTROL DEVICE FOR A HEAT-PUMP TYPE AIR CONDITIONING APPARATUS

[75] Inventor: Kenji Umezu, Shizuoka, Japan

[73] Assignee: Tokyo Shibaura Denki Kabushiki Kaisha, Kawasaki, Japan

[21] Appl. No.: 489,497

[22] Filed: Apr. 28, 1983

[30] Foreign Application Priority Data

May 4, 1982 [JP] Japan .................................. 57-73394

[51] Int. Cl.³ .................................................. F25B 1/00
[52] U.S. Cl. ...................................... 62/228.5; 62/230
[58] Field of Search ................ 62/196.1, 196.2, 196.3, 62/228.5, 228.3, 230, 208, 209, 160, 126, 129, 215, 226, 227; 236/1 EA

[56] References Cited

U.S. PATENT DOCUMENTS

| | | | |
|---|---|---|---|
| 2,412,981 | 12/1946 | Harrold | 62/230 X |
| 3,204,423 | 9/1965 | Resh, Jr. | 62/230 X |
| 3,499,297 | 3/1970 | Ruff et al. | 62/160 |
| 3,522,711 | 8/1970 | Shaughnessy | 62/226 X |

FOREIGN PATENT DOCUMENTS 54-119745  9/1979  Japan .
55-17027   2/1980  Japan .

Primary Examiner—Harry B. Tanner
Attorney, Agent, or Firm—Schwartz, Jeffery, Schwaab, Mack, Blumenthal & Koch

[57] ABSTRACT

A heat-pump type air conditioning apparatus comprising a compressor, a condenser, a throttle member, and an evaporator, which constitute a refrigerant circulation circuit, and an unloading circuit is connected to the compressor to carry out a load reduction control. The air conditioning apparatus further comprises a detector for detecting load condition applied on the compressor and generating a signal representing the detected load condition, and a detector for detecting a condition of a power source for driving the compressor and generating a signal relating to the detected condition of the power source. A control unit is operatively connected to the detectors for controlling the switching of the air conditioning apparatus from a normal, full-capacity operation to a controlled, reduced capacity operation or vice versa in accordance with the signals regarding the detected load and the detected condition of the power source.

9 Claims, 6 Drawing Figures

FIG. I
PRIOR ART
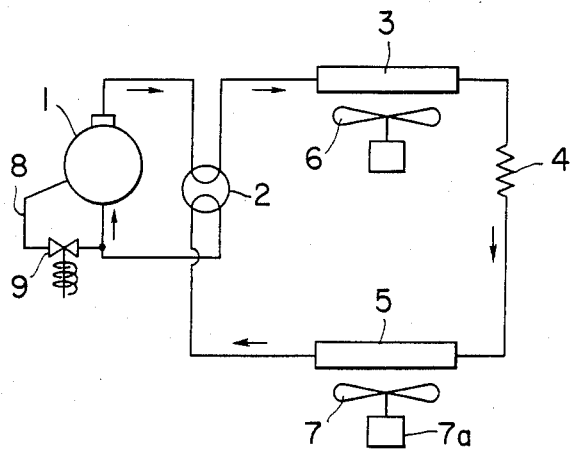
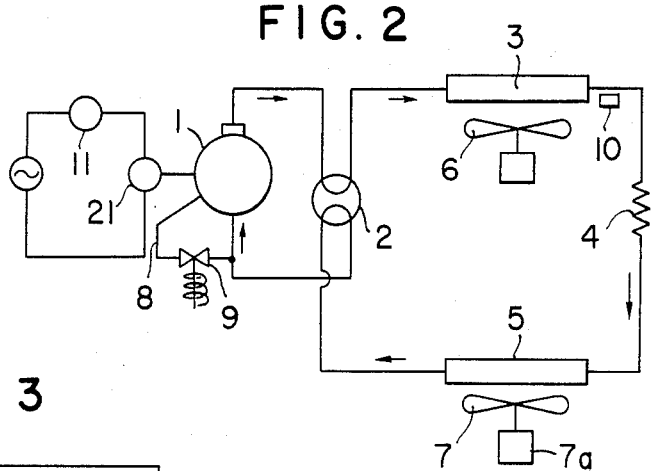
FIG. 3
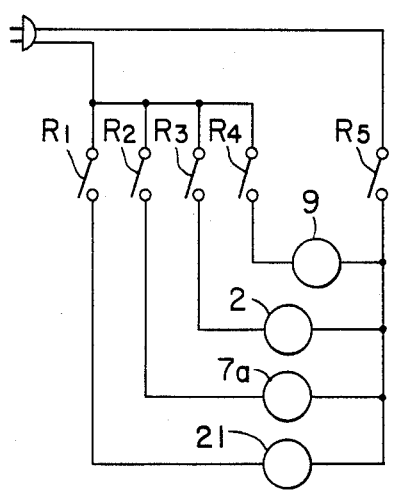

LOAD CONTROL DEVICE FOR A HEAT-PUMP TYPE AIR CONDITIONING APPARATUS

BACKGROUND OF THE INVENTION

This invention relates to a heat-pump type air conditioning apparatus in which heating or cooling operation can be adequately switched from normal, full-capacity operation to reduced-capacity operation.

A heat-pump type air conditioning apparatus generally comprises a compressor, heat exchangers located on indoor and outdoor sides of the system (hereinafter called indoor and outdoor heat exchangers, respectively), a throttling member, and fans located on indoor and outdoor sides of the system (hereinafter called indoor and outdoor fans, respectively).

In the heating operation, for example, of the heat-pump type air conditioning apparatus, a refrigerant discharged from the compressor towards a four-way valve circulates through the indoor heat exchanger acting as a condenser, a capillary tube acting as an expansion member, the outdoor heat exchanger acting as an evaporator, the four-way valve, and then returns to the compressor. The indoor and outdoor fans are provided for the indoor and outdoor heat exchangers, respectively, which act as the condensor and evaporator, to enhance heat exchanging effects.

During the heating operation, since the temperature difference between indoors and outdoors generally changes relatively abruptly, refrigerant compressing load on the compressor also widely changes. Under the circumstances, when a voltage of a power supply source adapted to operate the compressor lowers, the output of the electric motor for driving the compressor also lowers, and particularly, when the refrigerant compressing load is considerably high, there may occur in an extreme case where the compressor comes to stop.

In order to obviate this defect, it was necessary to control the load reduction of the compressor by stopping the outdoor fan or controlling the output of the compressor. Control of load reduction was carried out by stopping the outdoor fan and then controlling the opening and closing of an electromagnetic valve incorporated into an unloading or return circuit which acts so as to return a portion of the refrigerant from the pressure chamber of the compressor to the suction side thereof. The timing for deenergizing the outdoor fan driving motor and for opening the electromagnetic valve in the return or unloading circuit were determined by either one of the following two methods. The method for deenergizing the outdoor fan motor was carried out by determining, as a control reference, a time at which the load applied on the compressor exceeded a predetermined value. In other words, discharge pressure of the refrigerant from the compressor or condensing temperature of the refrigerant at the indoor heat exchanger was measured. When the measured value exceeded a predetermined value, the outdoor fan driving motor was deenergized.

The other method for controlling the timing of opening the electromagnetic valve was carried out by determining the control reference at a time when the magnitude of the voltage of the power supply source or the magnitude of the current flowing through the compressor driving motor reached a predetermined value. Thus, the time was determined by the condition of the power source.

In the heating operation of a conventional heat-pump type air conditioning apparatus, the heating operation from the normal operation to reduced-capacity operation was switched by taking into consideration, as a control reference, one of either the load condition of the compressor or the power source condition of the compressor.

In a case where the heating operation is switched from the normal operation to the reduced-capacity operation solely on the basis of the load condition of the compressor, when the detected condensing temperature of the refrigerant exceeds a temperature predetermined for switching the heating operation, the outdoor fan driving motor is stopped or a portion of the refrigerant is returned through the unloading circuit. However, in this method, the predetermined temperature will have to be preset within a low temperature range, for example, between 45°–55° C. in view of a case where the voltage of the power supply source lowers to about 85% of the rated voltage. The low predetermined temperature hinders the condensing temperature at the indoor heat exchanger from rising and it has been impossible to attain sufficient heating capability.

In addition, when a commercial household AC source is utilized as a power source, the starting current has to be limited below 45A in accordance with the "Electric Appliance and Material Control Law", so that it becomes necessary to use a motor for driving the compressor with relatively small capacity or to use a reactor for limiting the starting current. For this reason, the output of the motor falls off sharply in a case where the voltage of the power source is low, and hence, it was necessary to determine the predetermined temperature to be in a considerably low temperature range of 45°–55° C.

On the other hand, where the heating operation is switched on the basis of the condition of the supply power source, the heating operation is switched from the normal operation to the reduced-capacity operation at a time when the voltage of the power source falls below a predetermined value or the current from the power source exceeds a predetermined value. In this case, when the voltage is considerably high, the output of the compressor becomes too large and the refrigerant discharge pressure exceeds a suitable pressure, thus lowering the durability of the compressor.

Regarding the cooling operation of the heat-pump type air conditioning apparatus of the type described above, it will easily be understood that the refrigerant from the compressor flows through the four-way valve and circulates in a direction opposite to that described in connection with the heating operation. In the cooling operation, when the load of the indoor or outdoor heat exchanger reduces, suction and discharge pressures of the compressor lower and the load on the compressor also lowers. The evaporation temperature of the indoor heat exchanger lowers in response to the lowering of the suction pressure, so that under an extreme condition frost may be formed on the indoor heat exchanger now acting as an evaporator. Moreover, when the load on the indoor heat exchanger lowers, the refrigerant under low pressure returns to the compressor without being completely evaporated, which results in a significant loss of compressor operation.

SUMMARY OF THE INVENTION

An object of this invention is to obviate defects encountered in a conventional heat-pump type air conditioning apparatus and provide an improved heat-pump type air conditioning apparatus capable of smoothly switching the operation from a mode of normal operation to the reduced-capacity operation or vice versa.

Another object of this invention is to provide an improved heat-pump type air conditioning apparatus in which the operation condition is switched on the basis of both the load condition of the compressor and the condition of the power supply source.

According to this invention there is provided a heat-pump type air conditioning apparatus of the type comprising a compressor, a condenser, an expansion member, and an evaporator, which constitutes a refrigerant circulation circuit and in which said compressor has a variable compression capacity to carry out load reduction control during heating or cooling operations of the air conditioning apparatus, wherein the air conditioning apparatus further comprises a detector for detecting a load condition applied to the compressor and for generating a signal representing the detected load condition, a detector for detecting a condition of a power source for driving the compressor and for generating a signal representing the detected condition of the power source, and a control unit for controlling switching of an operation condition of the air conditioning apparatus from a normal operation to a reduced capacity operation or vice versa in accordance with the signals indicating the detected load and the detected condition of the power source.

BRIEF DESCRIPTION OF THE DRAWINGS

In the accompanying drawings:

FIG. 1 shows a circuit diagram of a conventional heat-pump type air conditioning apparatus;

FIG. 2 shows a circuit diagram of a heat-pump type air conditioning apparatus according to this invention;

FIGS. 3 and 4 show circuit diagram of a control circuit for controlling the operation of the air conditioning apparatus shown in FIG. 2;

DESCRIPTION OF THE PREFERRED EMBODIMENT

Figure 4:
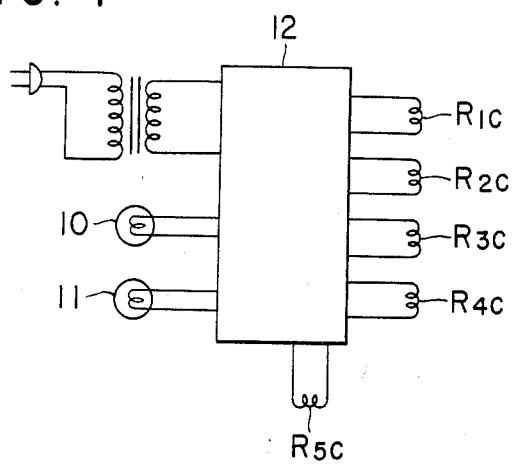

To aid full understanding of this invention, general aspects of a heat-pump type air conditioning apparatus and various problems encountered in known apparatus will first be considered with reference to FIG. 1.

Referring to FIG. 1, in a heating operation of a heat-pump type air conditioning apparatus a refrigerant flow is shown by arrows and the refrigerant discharged from a compressor 1 passes through a four-way valve 2 to circulate through a heat exchanger 3 located indoors and acting as condenser, a capillary tube 4 for effecting throttling operation, a heat exchanger 5 now acting as an evaporator and located outdoors, and the four-way valve 2, and then returns to the compressor 1. Fans 6 and 7 are located on the indoor and outdoors, respectively for enhancing the heat exchanging efficiency. An unloading circuit 8 with an electromagnetic valve 9 is connected to the compressor 1.

With the heat-pump type air conditioning apparatus of the type described above, the load reduction control of the compressor is accomplished by deenergizing a motor 7a for driving the outdoor fan 7 and controlling the opening and closing of the electromagnetic valve 9 in the unloading circuit 8 to return a portion of the refrigerant from a pressure chamber of the compressor 1 towards the suction side.

As described hereinbefore, with the conventional heat-pump type air conditioning apparatus, when the heating operation is carried out, either the load condition of the compressor or the condition of the power supply source is considered as a reference for switching the heating operation from the normal operation to reduced-capacity operation. For example, in a case where the heating operation is performed in accordance with the load condition, when the detected temperature of the condensed refrigerant exceeds a predetermined temperature for switching operation, the outdoor fan 7 is stopped or a portion of the refrigerant is passed through unloading circuit 8. However, in a case where the supply voltage has lowered to about 85% of the rated voltage, it becomes necessary to set the predetermined temperature to a relatively low value within a range of 45°–55° C., so that the condensing temperature does not sufficiently rise and the heating effect can not be fully atained. When the supply voltage lowers, since the output of the compressor driving motor drops sharply, the predetermined temperature will have to be further lowered.

In a case where the heating operation is controlled in accordance with the condition of the voltage or current of the power source, when the voltage is considerably high, the input to the compressor driving motor becomes large and the refrigerant discharge pressure of the compressor also becomes high. Thus, the durability of the compressor is decreased.

Taking the above facts into consideration, a preferred embodiment according to this invention will be described below in conjunction with FIGS. 2 through 5.

Referring to FIG. 2, in which arrows show the flow of refrigerant in the heating operation of a heat-pump type air conditioning apparatus according to this invention, the refrigerant discharged from the compressor 1 towards a four-way valve 2 circulates through an indoor heat exchanger 3 now acting as a condenser, a capillary tube 4, an outdoor heat exchanger 5 now acting as an evaporator, and then returns to the compressor 1 through the four-way valve 2. An unloading circuit 8 incorporated with an electromagnetic valve 9 is connected to the compressor 1. According to this invention, a load detector 10 for detecting a condensing temperature of the refrigerant is located on the outlet side of the condensor 3 to generate an electric signal representing the detected condensing temperature and a detector 11 for detecting condition of the power source is connected thereto to measure the voltage or current of the power source applied to the motor 21 for driving the compressor 1. In the preferred embodiment the detector 11 is a current meter which detects a current passing through the compressor driving motor to generate an electric signal representing the detected current.

Figure 4A:
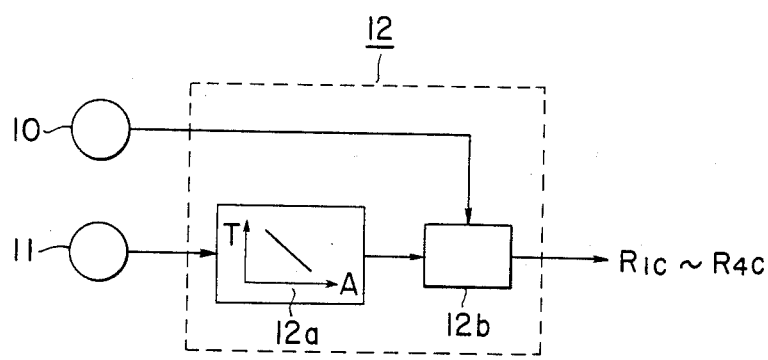
FIG. 4a is a block diagram showing the detail of the control circuit 12 shown in FIG. 4.

FIGS. 3 and 4 show control means for controlling the heating operation in response to the signals from the detectors 10 and 11. As shown in FIG. 3, the compressor driving motor 21, the outdoor fan driving motor 7a, the four-way valve 2, and the electromagnetic valve 9 are connected to the power source through relay contacts $R_1$, $R_2$, $R_3$, and $R_4$, respectively. A common relay contact is designated by a letter $R_5$ in FIG. 3. The relay contacts $R_1$ through $R_5$ are ON-OFF controlled by relay coils $R_{1c}$ through $R_{5c}$, respectively, through a control circuit 12, which includes an operating device 12a and a comparator 12b operatively connected to the detectors 10 and 11 as diagrammatically shown in FIG. 4a. The arithmetic operation device 12a acts to convert a signal from the detector 11 representing the current condition into a signal representing a temperature and the comparator 12b compares a signal representing the converted temperature and that representing the condensing temperature from the detector 10. Thus, the relays $R_{1c}$–$R_{4c}$ are controlled by the output signal from the comparator 12b. This will be understood from the following description with reference to FIG. 5, in which a relative value between signals of the load condition and supply source condition is compared either with a predetermined value a shown by a dotted line or a predetermined value b shown by a solid line. During the comparison, when teh relative value exceeds the predetermined value a or b, the current to the relay coil $R_{2c}$ is interrupted and the current passes to the relay coil $R_{4c}$, and on the other hand, when the relative value does not reach the predetermined value a or b, the current to the relay coil $R_{4c}$ is interrupted and the current is supplied to the relay coil $R_{2c}$.

The heat-pump type air conditioning apparatus according to this invention operates in the following manner.

In order to start the heating operation, current is first supplied to the relay coils $R_{1c}$, $R_{2c}$, $R_{3c}$, and $R_{5c}$ by the operation of the control circuit 12 and the relay contacts $R_1$, $R_2$, $R_3$, and $R_5$ are closed to operate the compressor 1, the outdoor fan 7, and the four-way valve 2 to start the heating operation. During the heating operation, the condensing temperature of the indoor heat exchanger 3 is detected by the load detector 10 and the signal representing the detected condensing temperature is sent to the control circuit 12, and at the same time, the current flowing through the compressor driving motor 21 is measured by the power source condition detector 11 and a signal representing the measured current is sent to the control circuit 12 in which the signal is converted into one regarding the temperature, which is then compared with the signal sent from the detector 11.

A case in which a current having a constant value $A_1$ flows and the condensing temperature rises will be described hereunder in conjunction with FIG. 5.

In a case where the condensing temperature is below $0_a°$ C., since the relative value regarding the condensing temperature and the current is below the predetermined value, the control circuit 12 does not operate and the normal heating operation will be continued.

Figure 5:
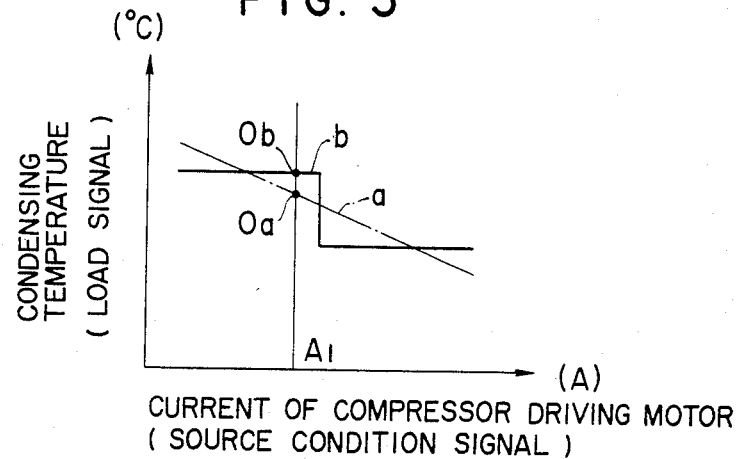
FIG. 5 is a graph showing predetermined values determined by reference values for switching the operating condition.

In a case where the predetermined value accords with the value a in FIG. 5, and when the condensing temperature exceeds the value $0_a°$ C., the relative value exceeds the predetermined value a and the control circuit 12 operates, whereby the current to the relay coil $R_{2c}$ is interrupted to open the relay contact $R_2$ and for stopping the operation of the fan 7. Simultaneously, current is supplied to the relay coil $R_{4c}$ to close the relay contact $R_4$ to open the electromagnetic valve 9 in the unloading circuit 8. As a consequence, the air conditioning apparatus is switched to reduced-capacity operation from the normal heating operation. Conversely, when the condensing temperature becomes lower than $0_a°$ C., the control circuit 12 operates in a manner reverse to that described above, thereby opening relay contact $R_4$ and closing relay contact $R_2$, so that the heating operation is switched from reduced capacity operation to the normal operation.

In the other case where the predetermined value accords with the value b shown in FIG. 5, the heating operation is switched from the normal operation to the controlled operation or vice versa in accordance with the fact that whether the condensing temperature is above or below the value $0_b°$ C.

In general, since the current flowing through the compressor driving motor 21 changes together with the condensing temperature, the predetermined values are changed along the lines representing the values a and b and the switching operation effected by the control circuit 12 also changes in response to the change of the predetermined value.

According to this invention, the predetermined value, i.e. the switching time for switching the heating operation from the normal operation to the reduced capacity operation or vice versa changes in response to the variations of the load condition and the power supply condition. Therefore, more suitable heating operation can be carried out then in a conventional method in which the heating operation is controlled in accordance with either one of the load condition and the power source condition.

Moreover, the detection of the refrigerant discharge pressure maybe utilized for detecting the load condition and the detection of the voltage of the power source maybe utilized for detecting the power source condition instead of current.

In the foregoing description, although this invention was described in relation to the heating operation, it will be clear that the cooling operation can be effected similarly, in which the refrigerant flows in a direction reverse to that in the heating operation and the indoor and outdoor heat exchangers are operated as an evaporator and a condenser, respectively. The operation condition can also be switched in the cooling operation in substantially the same manner as that described in connection with the heating operation.

Advantages or merits attained by the heat-pump type air conditioning apparatus according to this invention are summarized as follows.

a. The operation condition can be switched from normal operation to reduced-capacity operation or vice versa in response to the variations of the load condition of the compressor and the condition of the power supply source.

b. Since it is not necessary to limit a preset value, i.e. a predetermined condensing temperature at the time of lowering the voltage of the power supply source, premature unloading of the compressor can be prevented and a high heating temperature can be maintained in the heating operation.

c. In a case of using a commercial power source, the condensing temperature can be maintained at a high temperature so that the compressor can operate with high performance.

d. Where the voltage of the power source increases, the operation condition can be switched to the reduced-capacity operation before the refrigerant discharge pressure of the compressor becomes extremely high, so that durability of the compressor can be greatly improved.

e. It is possible to automatically switch the operation condition by adding small members to the conventional air conditioning apparatus such as shown in FIG. 1.

What is claimed is:

1. A load control device for a heat-pump type air conditioning apparatus of the type comprising a compressor, a condenser, an expansion member, and an evaporator which constitute a refrigerant circulation circuit, and in which said compressor is subject to load reduction control by an unloading circuit connected to said compressor and provided with an electromagnetic valve permitting refrigerant to flow from a compression chamber of said compressor to a suction side of said compressor, comprising:

means for detecting a load condition applied to said compressor and for generating a load condition signal representing the detected load condition;

means for detecting a condition of a power source for driving said compressor and for generating a power source signal representing the detected condition of the power source; and means for controlling switching of operation of the air conditioning apparatus between full-capacity operation and reduced-capacity operation in accordance with said power source signal and said load signal at least by actuating said electromagnetic valve in said unloading circuit according to said signals.

2. The air conditioning apparatus according to claim 1 wherein said means for controlling the operation condition comprises an operating device operatively connected to said means for detecting the condition of the power source to convert the detected power source condition to the load condition and a comparator which compares a signal of the converted load condition with a signal from said means for detecting load condition.

3. The air conditioning apparatus according to claim 1 wherein said operating condition is a heating operation.

4. A load control device for a heat-pump type air conditioning system, said air conditioning system having a full-capacity operational mode and a reduced-capacity operational mode and comprising a compressor, a condenser, an expansion member, and an evaporator together comprising a refrigerant circulation circuit, said load control device comprising:

unloading means connected to said compressor for providing a refrigerant path from a compression chamber of said compressor to a suction side of said compressor during an operative state thereof corresponding to a reduced-capacity operational mode, and for blocking said path in an inoperative state thereof corresponding to said full-capacity operational mode;

first means for sensing a load parameter indicative of the load on said compressor and for generating a load signal indicative of said load parameter as sensed;

second means for sensing a power source parameter indicative of the condition of a power source for driving said compressor, and for generating a power source signal indicative of said power source parameter as sensed; and means responsively connected to said first and second sensing means, and controllingly connected to said unloading means, for determining a reference load as a function of said power source parameter as sensed, for comparing said reference load with said load parameter as sensed, and for switching said unloading means between said inoperative state and said operative state on the basis of said comparison of said reference load and said load parameter as sensed.

5. A load control device as claimed in claim 4, wherein said load parameter comprises the condensing temperature of the refrigerant.

6. A load control device as claimed in claim 4 wherein said power source parameter comprises the current provided by said power source.

7. A load control device as claimed in claim 4 wherein said determining means also controls a fan associated with said evaporator.

8. A load control device as claimed in claim 5 wherein said power source parameter comprises the current provided by said power source to said compressor.

9. A load control device as claimed in claim 8 wherein said determining means also controls a fan associated with said evaporator.

* * * * *